United States Patent [19]

Curtis

[11] Patent Number: 5,060,458
[45] Date of Patent: Oct. 29, 1991

[54] PROTECTIVE DOG COAT

[76] Inventor: Cynthia L. Curtis, Box 61M, S. R. 2, 7271 Bond St., St. Leonard, Md. 20685-9620

[21] Appl. No.: 569,969

[22] Filed: Aug. 20, 1990

[51] Int. Cl.$^5$ .......................... A01K 13/00; B68C 5/00
[52] U.S. Cl. ........................................................ 54/79
[58] Field of Search ...................... 54/79, 80; 119/143

[56] References Cited

U.S. PATENT DOCUMENTS

| | | | |
|---|---|---|---|
| 683,570 | 10/1901 | McWilliam | 54/79 |
| 935,166 | 9/1909 | Rorabeck . | |
| 2,131,495 | 9/1938 | Allen | 54/79 |
| 2,443,831 | 6/1948 | Miller | 54/79 |
| 2,850,860 | 9/1958 | Torell et al. | 54/79 |
| 3,248,852 | 5/1966 | Schwartz | 54/79 |
| 4,355,600 | 10/1982 | Zierinski | 119/143 |
| 4,385,592 | 5/1983 | Goldstein | 119/96 |
| 4,577,591 | 3/1986 | Wesseldine | 119/143 |
| 4,718,375 | 5/1988 | Krieger | 119/160 |

FOREIGN PATENT DOCUMENTS 1029346 5/1966 United Kingdom ................ 119/143

Primary Examiner—Robert P. Swiatek

[57] ABSTRACT

A protective coat for dogs and the like, particularly designed for use by hunting and non-hunting dogs to provide safety thru visibility. The coat includes an outer shell of fabric lined with an inner lining fabric, or the like, for insulation during adverse weather conditions. The coat is easy to manufacture and is designed to allow substantial adjustability, permitting a given size to fit dogs of a considerable range of girth.

5 Claims, 2 Drawing Sheets

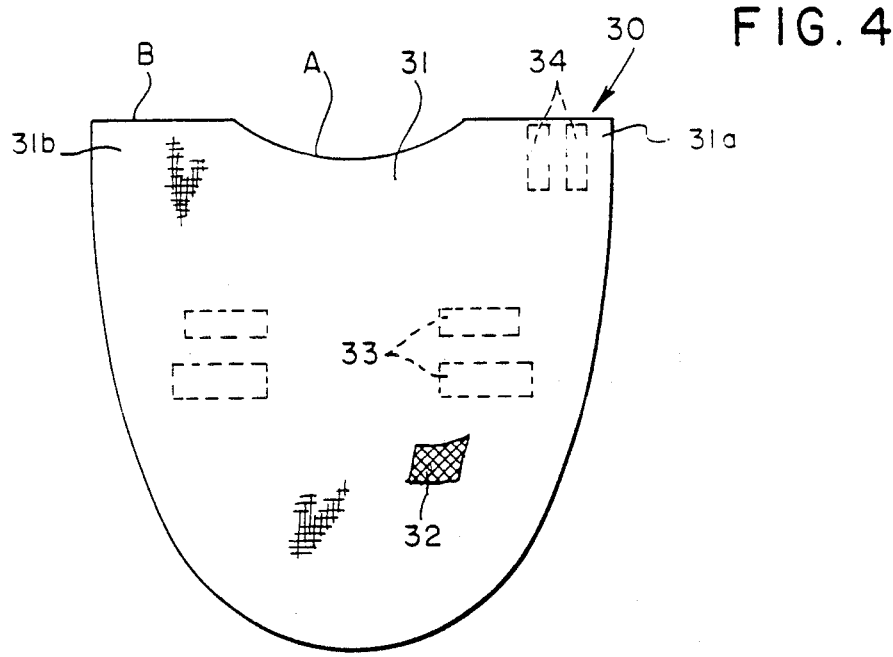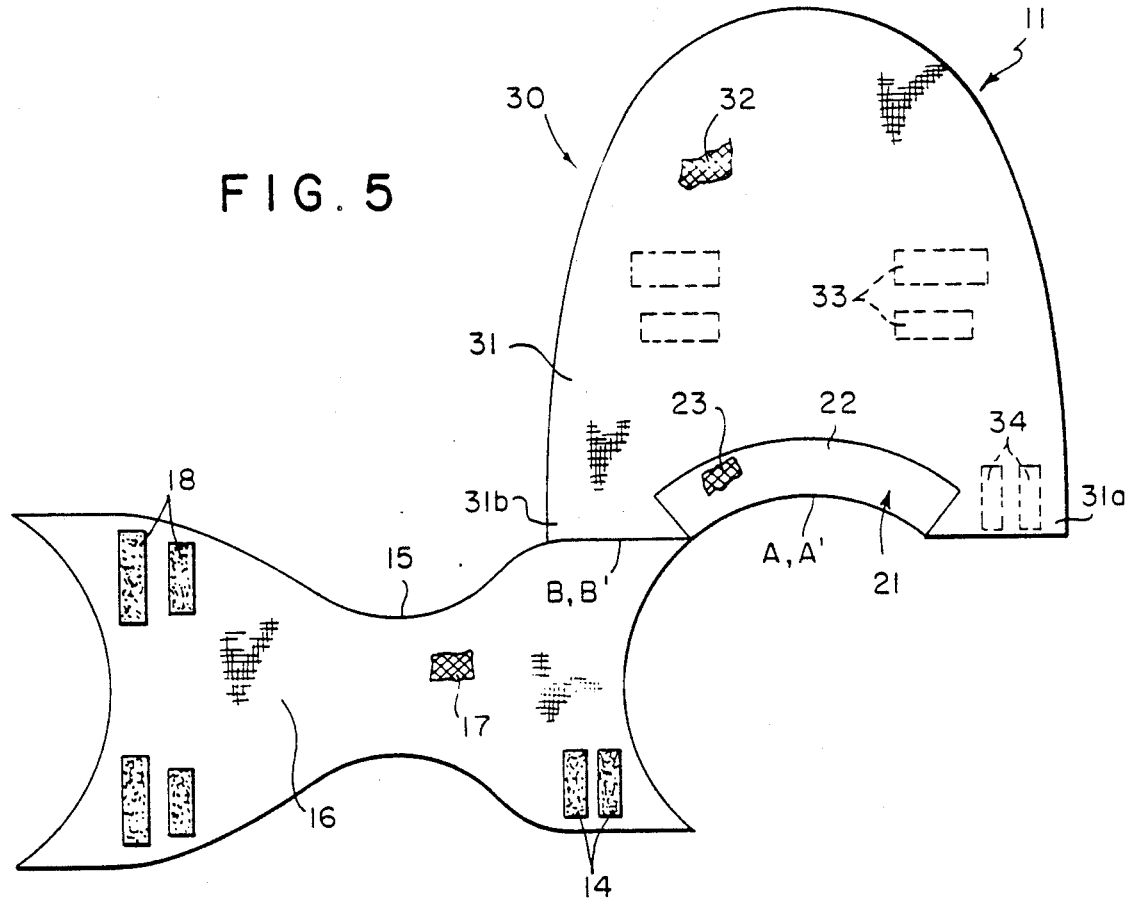

PROTECTIVE DOG COAT

BACKGROUND OF THE INVENTION (1) Field of the Invention

This invention relates generally to protective garments for animals, such as dogs, and in particular to a garment which is adjustable to accommodate animals of different size and shape.

While the invention, as will be apparent, is designed for many different domestic animals, it is principally directed to the dog and for this reason and for simplicity of discussion, the dog will be exclusively referred to hereafter.

(2) Description of the Prior Art

Providing protection and safety for dogs used in the sport of hunting has been a difficult problem in the past. Hunting has always been a popular pastime in this country but because of the increasing number of hunting accidents it is necessary to provide safe visible garments for hunting, both for the hunter and the dog. Many times a hunting dog is mistaken for game and for this reason, a safety garment such as a collar or vest is particularly important for the dog to wear during the hunt.

Also, because the hunting season comes during the time of year when the temperature is often below that which a particular breed is required to maintain a normal body temperature, it is often necessary to protect the animal from the bitter weather that exists during the hunting season.

Prior art animal garments have generally failed to provide comfortable protection against cold weather for the animal. Such prior art garments often irritate the dog during the hunt causing the hunter to stop the hunt. Other prior art dog coats are difficult to manufacture which raises the price of the coat. It is increasingly difficult to manufacture an animal garment that is flexible in size and is easily adjusted, permitting a given garment to fit a dog of a considerable range of sizes.

SUMMARY OF THE INVENTION

Accordingly, it is the object of this invention to provide a safe and protective coat for an animal, such as a dog.

It is a further object of this invention of provide a safety coat that is easily visible for hunting, as well as, non-hunting dogs.

It is a further object of the invention to provide an insulated coat to protect the animal against adverse weather conditions.

It is a further object of the invention to provide a dog coat which will allow the maximum comfort for the animal wearing it.

It is a further object of the invention to provide a dog coat which will accommodate dogs of different sizes.

It is a further object of the invention to provide a dog coat which is inexpensive and easy to manufacture.

The above mentioned and other features and objects of this invention and the manner of attaining them will become more apparent and the invention will best be understood by reference to the following description of an embodiment of the invention taken in conjunction with the accompanying drawings.

BRIEF DESCRIPTION OF DRAWINGS

FIG. 4 Is a top plan view of a pattern of the coat back piece.

FIG. 5 Is a plan view of the assembled dog coat.

DETAILED DESCRIPTION OF THE PREFERRED EMBODIMENT

Figure 1:
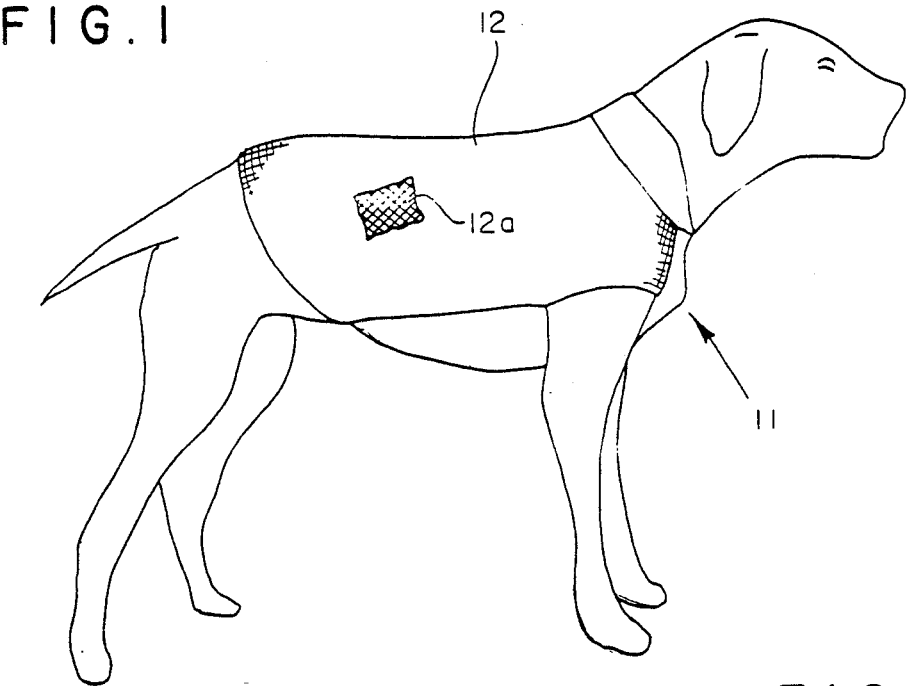
FIG. 1 Is a side plan view of the dog coat as worn by a dog.

With reference to FIG. 1, a dog is illustrated wearing a protective coat (11) of the subject invention. The coat (11) is constructed from any materials which provide the properties necessary to assist the functions of the coat. The coat has an outer shell (12) made from synthetic water resistant fabric in the preferred embodiment. As illustrated in the cut out portion of (12), an insulated liner is shown at (12a) and is made of wool, cotton, quilted synthetic or down material. Both the outer shell and the liner are constructed of various parts which will now be discussed in great detail.

Figure 2:
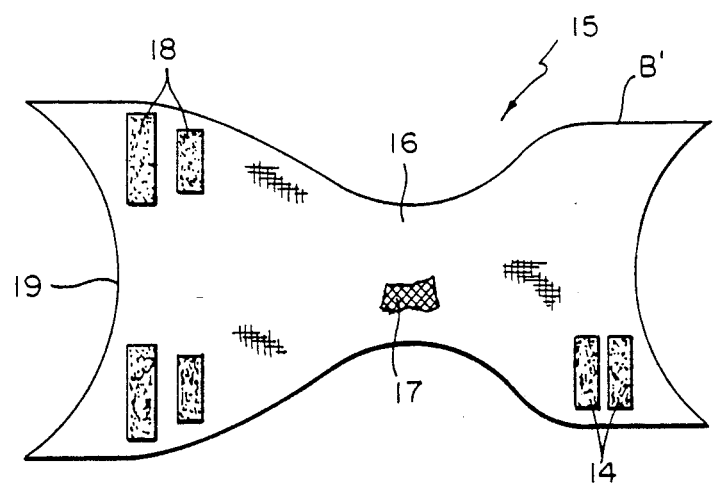
FIG. 2 Is a top plan view of a pattern for the coat breast cover piece.

Turning now to FIGS. 2-5 the outer shell and inner liner are illustrated prior to assemble. FIG. 2 shows the outer shell having a breast cover (15). The breast cover (15) has an outer breast shell (16) and an inner breast liner (17) as shown in the cut out. The inner breast liner (17) is secured to the outer breast shell (16) but may be detachably secured by other means such as fasteners. VELCRO fastening points (18), (or a similar type of fastening material), are sewn into place on each side of the outer breast shell (16) and at point (14) of the breast cover (15). The breast cover (15) extends from between the forelegs rearward, covering the chest and underbelly, usually the least protected area of a dog and is cut elliptically across the rear end (19) to accommodate both male and female dogs.

Figure 3:
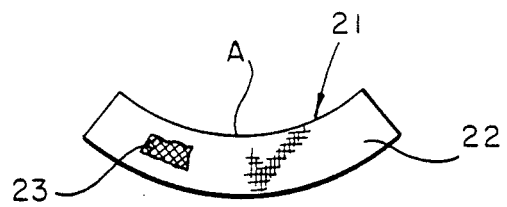
FIG. 3 Is a plan view of a pattern for the coat collar piece.

The forward end of the outer shell terminates in collar piece (21) as shown in FIG. 3. The collar piece (21) is constructed of an outer collar shell (22) and an inner collar liner (23), sewn to the underside of outer collar shell (22). The collar piece (21) is angularly disposed and is attached respectively to a back piece (30). The collar (21) is sewn at the neckline area (A, A') of the backpiece (30).

The back piece (30) is constructed of an outer back shell (31) and an inner back liner (32), sewn to the underside of outer back shell (31). The back piece (30) further includes a right shoulder area (31a) and a left shoulder area (31b). VELCRO fastening pieces (33) are sewn on either side of the back liner (32) and at point (34). The back piece (30) is cut to cover the sides and back of the dog completely, providing maximum comfort and fit for the animal.

The FIG. 5 shows the coat fully assembled illustrating the outer shell portions, namely, the breast cover (15), collar piece (21) and back piece (30), sewn together at appropriate points (A, A') and (B, B'). The outer shell is made of a heavy, ripstop, cotton-polyester blend, for example, TEN MILE cloth or the equivalent, that is water repellant add resistant to tearing and fraying. For safety reasons, the outer shell is international orange/blaze orange, or the like, in color so as to be easily seen in a hunting area. The inner liner is made of a wool or other synthetic coat insulating material, provided to protect the dog against sub-zero temperatures during the hunting season. The dog coat (11) fastens together with VELCRO, or similar means, at points (14, 18, 33 and 34). VELCRO offers a firm holding fit but if necessary will pull free allowing the dog to escape if the coat should become twisted or entangled.

The dog coat (11) is fitted on the dog by the following method. The left shoulder are attaches with VELCRO fasteners at (14 and 34), encircling the dog's neck. The breast cover (15) is placed between the dog's forelegs rearward, covering the chest and belly area, attaching at VELCRO fasteners (18 and 33) on opposing sides of the underside of back piece (30).

The VELCRO fasteners include long interlocking strips attached at points (14, 18, 33, and 34). The VELCRO strips interconnect at fastening points (14 and 34) of the right shoulder area (31a) of the dog coat (11) and at the side margins, fastening point (18), of the outer breast shell (16) of breast cover (15) to the side margins of the inner back liner (32), fastening point (33), of back piece (30). The VELCRO fastening strips are long in length, 4 to 5 inches, and are attached on the dog coat (11) in a horizontal manner so as to provide substantial size adjustment, permitting a given size to fit dogs of a considerable range of girth.

It will be understood that the forgoing description merely illustrates the invention, and that modifications may be incorporated therein within the scope of the appended claims. For example, the inner lining of the dog coat could be removed allowing the outer shell of the coat to be worn alone during warmer times of the year, specifically providing visible safety to the animal while in hunting areas. Other adjustable fastening mechanisms, such as hook-and-loop, buttoned flap, snaps and other similar well-known fastening materials can be used to attach the pieces of the coat together to custom fit around the animal to accommodate all but the most unusually shaped dogs. It is to be understood that the invention is not limited to the specific features shown, since the means and construction herein disclosed comprise a preferred form of putting the invention into effect. The invention is, therefore, claimed in any of its forms or modifications within the legitimate and valid scope of the appended claims, appropriately interpreted in accordance with the doctrine of equivalents.

I claim:

1. A protective coat for an animal, comprising,
   a breast cover having a breast outer shell and a breast cover inner liner, said breast cover inner liner attached to an underside of said breast cover piece outer fabric shell,
   a collar piece, said collar piece having an outer collar shell and an inner collar liner, said inner collar liner attached to an underside of said outer collar shell,
   a back piece, said back piece having an outer shell and a back inner liner, said back inner liner attached to an underside of said back outer shell,
   a fastening means having long interconnecting strips,
   said fastening means provided to secure said protective coat around an animal, attached on one side of said back piece inner liner of said back piece and to one side of said breast cover outer shell of said breast cover,
   said breast cover having an upper left-side area attached to said back piece at a right shoulder area,
   said collar piece attached to a neckline area of said back cover piece,
   said breast cover having an upper right side area attached by said fastening means to said back piece at a left shoulder area,
   said breast cover extended between an animal's forelegs rearward and attached to said back piece, by said fastening means, on one side of said back piece inner liner of said back piece.

2. The protective coat according to claim 1 wherein said breast cover, and said back piece are made of a heavy, water-repellant cotton-polyester blend.

3. The protective coat according to claim 1 wherein said outer shell includes a reflective surface.

4. The protective coat according to claim 1 wherein said back piece inner liner is made of wool.

5. The protective coat according to claim 1 wherein said fastening means comprises VELCRO fasteners.

* * * * *